United States Patent
Murakami et al.

(10) Patent No.: US 8,511,157 B2
(45) Date of Patent: Aug. 20, 2013

(54) PNEUMATIC CIRCUIT FOR TIRE TESTING DEVICE, TIRE TESTING DEVICE, AND TIRE TESTING METHOD

(75) Inventors: Masao Murakami, Takasago (JP);
Yoshiaki Matsubara, Takasago (JP);
Maiko Nakayama, Takasago (JP);
Hajime Takeda, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 90 days.

(21) Appl. No.: 13/375,304

(22) PCT Filed: Jun. 17, 2010

(86) PCT No.: PCT/JP2010/004027
§ 371 (c)(1),
(2), (4) Date: Nov. 30, 2011

(87) PCT Pub. No.: WO2010/146859
PCT Pub. Date: Dec. 23, 2010

(65) Prior Publication Data
US 2012/0085158 A1 Apr. 12, 2012

(30) Foreign Application Priority Data
Jun. 17, 2009 (JP) .................................. 2009-144304

(51) Int. Cl.
*B60C 23/10* (2006.01)
(52) U.S. Cl.
USPC ......................................... 73/146.2; 152/415
(58) Field of Classification Search
USPC ............................................... 73/146–146.8
See application file for complete search history.

(56) References Cited

U.S. PATENT DOCUMENTS

| | | | |
|---|---|---|---|
| 4,404,849 A * | 9/1983 | Iwama et al. | 73/146 |
| 4,491,013 A | 1/1985 | Bubik | |
| 4,702,287 A | 10/1987 | Higbie et al. | |
| 4,916,943 A * | 4/1990 | Himmler et al. | 73/146 |
| 5,291,776 A | 3/1994 | Mallison | |

(Continued)

FOREIGN PATENT DOCUMENTS

| JP | 05 060640 | 3/1993 |
|---|---|---|
| JP | 5-60640 | 3/1993 |
| JP | 05 070095 | 10/1993 |
| JP | 6 95057 | 11/1994 |

OTHER PUBLICATIONS

International Search Report issued Aug. 3, 2010 in PCT/JP10/04027 filed Jun. 17, 2010.

*Primary Examiner* — Andre Allen
(74) *Attorney, Agent, or Firm* — Oblon, Spivak, McClelland, Maier & Neustadt, L.L.P.

(57) ABSTRACT

A pneumatic circuit whereby small amounts of variations in pneumatic pressure in a tire occurring during tire testing can be adjusted in a short time. The pneumatic circuit includes an air supply source which generates compressed air to be supplied to a tire retained in a tire testing device; a pressure regulating valve which regulates the pressure of the compressed air generated; a discharge/supply valve provided downstream of the pressure regulating valve and by which compressed air is supplied to, or discharged from, the tire; a pressure detection unit provided downstream of the discharge/supply valve and which detects the tire pressure inside the tire; and a volume adjustment mechanism provided between the pressure regulating valve and the tire and which increases or decreases the volume of compressed air in an airflow path between the tire and the pressure regulating valve, as well as in the tire.

12 Claims, 4 Drawing Sheets

(56) References Cited

U.S. PATENT DOCUMENTS

| | | | |
|---|---|---|---|
| 5,587,698 A * | 12/1996 | Genna | 340/442 |
| 6,758,088 B2 * | 7/2004 | Claussen et al. | 73/146 |
| 6,976,391 B2 * | 12/2005 | Maquaire | 73/146 |
| 7,219,540 B2 * | 5/2007 | Nordhoff | 73/146 |
| 7,817,024 B2 * | 10/2010 | Ru | 340/442 |
| 7,911,332 B2 * | 3/2011 | Caretta et al. | 340/442 |
| 2004/0112130 A1 * | 6/2004 | Maquaire | 73/146.2 |
| 2005/0229692 A1 * | 10/2005 | Gonzaga | 73/146 |
| 2006/0174943 A1 * | 8/2006 | Alff | 137/224 |
| 2008/0190188 A1 * | 8/2008 | Cho | 73/146.2 |

* cited by examiner

PNEUMATIC CIRCUIT FOR TIRE TESTING DEVICE, TIRE TESTING DEVICE, AND TIRE TESTING METHOD

TECHNICAL FIELD

The present invention relates to a pneumatic circuit used in a tire testing device such as a uniformity machine, a tire testing device provided with the pneumatic circuit, and a tire testing method for testing a tire by use of the pneumatic circuit.

BACKGROUND ART

Conventionally, a tire as a finished product is subjected to tire testing to determine the quality thereof by measuring uniformity or the like (uniformity check). For example, testing for uniformity measurement on a tire for passenger car is basically performed according to the following procedure by use of a testing device shown in Patent Literature 1.

A tire testing device described in Patent Literature 1 includes a pair of upper and lower rims, a factory air source that outputs compressed air to be supplied to a tire held between both the rims, and a pneumatic circuit that regulates the pressure of the compressed air output from the factory air source and then supplies the resulting compressed air to the tire. The tire testing is performed after the tire is inflated by this pneumatic circuit.

The pneumatic circuit includes two systems of piping branched from each other at the middle, and a changeover valve. One piping is piping of bead seat system for inflating the tire in a short time to fit the tire to the rims, and the other is piping of testing system used for tire testing. The changeover valve switches, for a pipe connected to the tire, between the piping of bead seat system and the piping of testing system, whereby the tire can be inflated by use of these two systems of piping routes.

Using this tire testing device, the tire testing is performed as follows. A tire carried from the upstream of an inspection line is set on the rims. The tire is then inflated in a short time by use of the piping of bead seat system. The air pressure of compressed air to be supplied to the tire through the piping of bead seat system is generally set to a pressure (e.g., about 0.4 MPa) higher than a testing air pressure that is a pressure used in tire testing, and the internal pressure of the tire is maintained at this air pressure for about 1 second including the pressure rise time.

The changeover valve is then operated to switch, for the flow path of compressed air, from the piping of bead seat system to the piping of testing system. A pressure regulating valve is provided at the middle of the piping of testing system. The pressure regulating valve decompresses high-pressure compressed air to the testing air pressure (e.g., about 0.2 MPa). The thus-decompressed compressed air is supplied into the tire through the piping of testing system, whereby the air pressure inside the tire is regulated to the above-mentioned testing air pressure. A drum including a load measuring instrument is pressed onto the tire having an internal pressure thus maintained at the testing air pressure, and the load measuring instrument measures a repulsive force generated in the tire at that time. Due to this, the uniformity of the tire is measured.

As the above-mentioned pressure regulating valve, a servo-type pressure regulator is often used as shown in Patent Literature 2.

In the above-mentioned tire testing, the variation of the air pressure inside the tire during testing is known to seriously affect a measurement result of uniformity. Therefore, it is important to further accurately maintain the air pressure inside the tire at a fixed testing air pressure in order not to market a defective product, nor to falsely determine a non-defective product as defective.

However, actual tire testing frequently involves change of air pressure, and the air pressure decreases or increases in rare cases. Such a change of the air pressure inside the tire is as small as about 0.5 kPa in some cases and as large as about 1 kPa in other cases. However, even a change of air pressure as small as about 0.5 kPa seriously affects the measurement result of uniformity. For example, when the repetitive stability of the testing device is confirmed, a same tire has to be repetitively tested. However, if the air pressure inside the tire changes in each testing, the repetitive stability of the testing device cannot be surely determined since the measurement result is differed in every measurement even if the same tire is used, leading to the difficulty to secure the quality for testing device/testing line.

It is difficult to regulate a minor change of air pressure as described above by use of such a pressure regulating valve generally used in the tire testing device shown in Patent Literature 1. The pressure regulating range of such a general pressure regulating valve is about 1.0 MPa, and the pressure regulating accuracy thereof is ±0.1% or about 1 kPa at most. The pressure regulating valve having pressure regulating accuracy of only about 1 kPa can never regulate the air pressure inside the tire that varies at a level of about 0.5 kPa during tire testing.

The servo-type pressure regulating valve disclosed in Patent Literature 2 is excellent in pressure regulating accuracy but low in responsiveness. Therefore, this valve can respond to gentle and steady variation in air pressure but cannot timely regulate the air pressure inside the tire within a tire testing time of only about 1 second. Namely, it is difficult to regulate the air pressure inside the tire, which varies during such short-time testing, by use of the servo-type pressure regulating valve as shown in Patent Literature 2. Further, the servo-type pressure regulating valve is expensive, and the use thereof leads to a steep rise in price of the tire testing device.

CITATION LIST

Patent Literature

[PATENT LITERATURE 1] Japanese Examined Patent Application Publication No. H6(1994)-95057
[PATENT LITERATURE 2] U.S. Pat. No. 5,291,776

SUMMARY OF INVENTION

The present invention has an object to provide a pneumatic circuit for tire testing device, capable of surely adjusting minor variation of air pressure, which is caused during tire testing, in a short time. The present invention also has an object to provide a tire testing device and a tire testing method, capable of accurately inspecting a tire at low cost by using the pneumatic circuit.

The present invention provides a pneumatic circuit provided in a tire testing device having a tire holding unit such as a pair of rims, for example, for holding a tire, including: an air supply source for supplying compressed air to the tire held by the tire holding unit; a pressure regulating valve for regulating the pressure of the compressed air, which is supplied from the air supply source to the tire, to a testing air pressure; a pressure detection unit for detecting an air pressure to be exerted on the inside of the tire by the supply of the compressed air;

and a volume adjustment mechanism provided in an airflow path between the inside of the tire and the pressure regulating valve, the volume adjustment mechanism increasing/decreasing, according to variation of the air pressure, the volume of the compressed air that exerts pressure on the inside of the tire, which is pressure-regulated by the pressure regulating valve.

The present invention also provides a tire testing device and a tire testing method using the above-mentioned pneumatic circuit.

EMBODIMENTS FOR CARRYING OUT THE INVENTION

Figure 1:
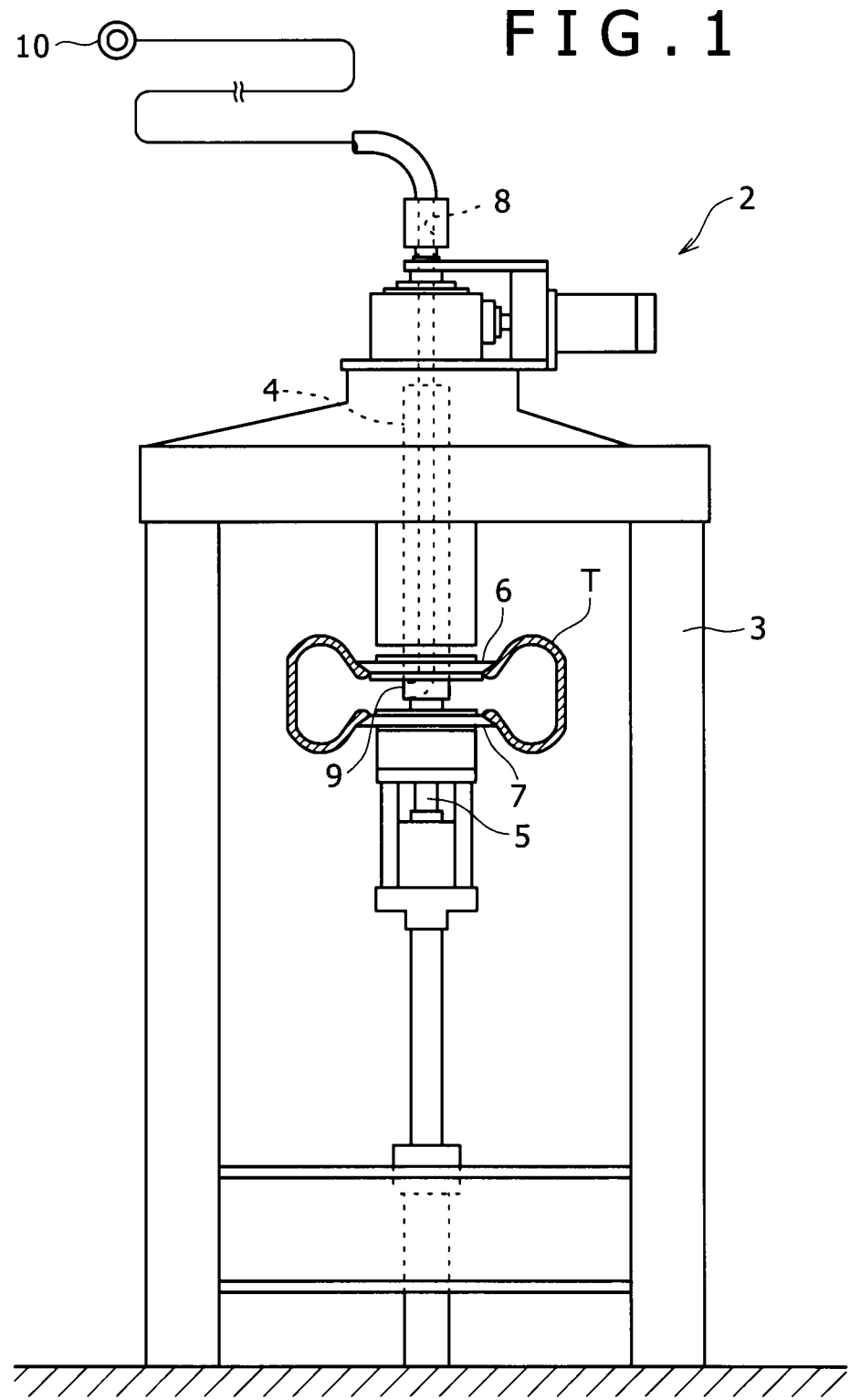
FIG. 1 A front view of a tire testing device according to each embodiment of the present invention.
Figure 2:
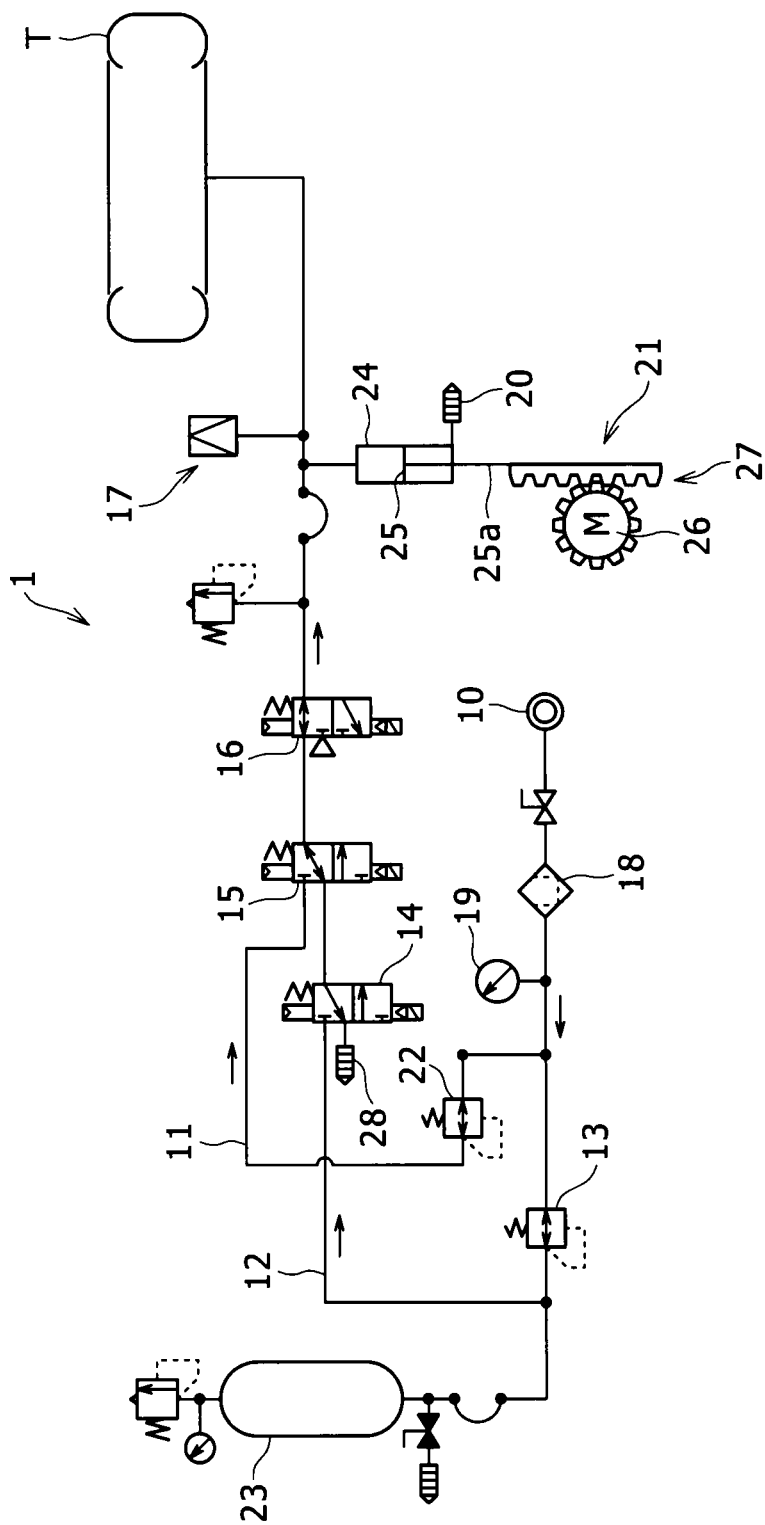
FIG. 2 A view showing a pneumatic circuit according to a first embodiment of the present invention.

A pneumatic circuit 1 of a first embodiment of the present invention and a tire testing device 2 provided with the pneumatic circuit 1 will be described based on FIGS. 1 and 2.

The tire testing device 2 is for performing a product inspection such as uniformity for a tire T as a finished product and is composed of a uniformity machine in this embodiment. The tire testing device 2 includes, as schematically shown in FIG. 1, a frame 3 provided on a floor surface in a tower shape; an upper tire shaft 4 and a lower tire shaft 5 mounted on the frame 3; rims 6, 7 fixed respectively to the tire shafts 4, 5; and a drum not shown. The tire shafts 4, 5 are disposed on upper and lower sides so as to be rotatable about a vertically extending common central axis. The rims 6, 7 are provided respectively on the lower end of the upper tire shaft 4 and on the upper end of the lower tire shaft 5, and the tire T is fixed to these rims 6, 7. The drum has an outer circumferential surface constituting a simulated road surface, and is rotationally driven around the central axis of the outer circumferential surface. The drum is arranged lateral to the tire T in such a manner that the outer circumferential surface of the drum, that is, the simulated road surface is contacted with the tire T by horizontally moving.

The "upper and lower sides" in the following description of the tire testing device 2 mean the upper and lower sides of paper surface of FIG. 1. In the pneumatic systematic diagram of FIG. 2, the air supply source 10 side is referred to as "upstream side" of the pneumatic circuit 1, the tire T side as "downstream side" thereof. These "upstream side" and "downstream side" correspond respectively to the upstream side and downstream side in a flow of compressed air in supply of compressed air into the tire T (the direction of arrows in the drawing).

The upper tire shaft 4 is provided on the upper side of the frame 3. The lower tire shaft 5 is arranged coaxially with the upper tire shaft 4 at a position downwardly distant from the upper tire shaft 4, and driven to move upward and downward. These tire shafts 4, 5 are approached to each other, whereby the tire T is held and fixed between the upper and lower rims 6, 7.

The above-mentioned tire shafts or drum includes a load measuring instrument. The load measuring instrument measures a force generated in the tire T under the simulated travel for the uniformity measurement of the tire T.

In the above-mentioned tire testing, the internal pressure of the tire T must be regulated to a predetermined air pressure. Therefore, the tire testing device 2 is equipped with the pneumatic circuit 1 for regulating the air pressure inside the tire T by supplying compressed air into the tire T or discharging compressed air from the tire T. The pneumatic circuit 1 constitutes an airflow path extending from the air supply source 10 to the inside of the tire T as shown in FIG. 1. The airflow path includes an air passage 8 formed inside the upper tire shaft 4 to vertically extend through it. The lower end of the air passage 8 constitutes an air supply port 9, and the air passage 8 communicates with the inside of the tire T through the air supply port 9.

The pneumatic circuit 1 supplies and discharges compressed air to and from the inside of the tire T through the air passage 8 and the air supply port 9. Concretely, the pneumatic circuit 1 is configured to regulate compressed air generated in the air supply source 10 to a predetermined air pressure and supply it to the tire T, and includes two flow path systems as shown in FIG. 2. One system is a bead seat system 11 for rapidly inflating the tire T to press the bead of the tire T to the rims, and the other system is a testing system 12 used in testing of the tire T. The compressed air circulating through the bead seat system 11 is regulated to an air pressure (bead seat pressure) of about 0.4 MPa, and the compressed air circulating through the testing system 12 is regulated to an air pressure (testing air pressure) of about 0.2 MPa that is lower than that in the bead seat system 11. The airflow path of the bead seat system 11 and the airflow path of the testing system 12 are branched from each other at the middle between the air supply source 10 and the tire T. The airs regulated to the respective air pressures in the respective paths are joined again into one airflow path.

Next, the testing system 12 and the bead seat system 11 will be described in detail.

The route of the testing system 12 includes a pressure regulating valve 13, a supply/exhaust valve 14, a changeover valve 15, a shutoff valve 16, and a pressure detection unit 17 in order from the air supply source 10 to the downstream side. The route of the bead seat system 11 is branched from the airflow path of the testing system 12 on the downstream side of the air supply source 10, and jointed to the route of the testing system 12 at the changeover valve 15. The piping route of this bead seat system includes a bead pressure regulating valve 22 provided at the middle of the piping route to regulate the pressure of the circulating air to a bead pressure.

The air supply source 10, which is a supply source of factory air composed of an air compressor or the like not shown, generates compressed air having a pressure equal to or higher than an air pressure sufficient to inflate the tire T, and supplies this compressed air to the tire T through the piping of the bead seat system 11 or the testing system 12. An air filter 18 for trapping dust or the like in the compressed air discharged from the air supply source 10 is provided between the air supply source 10 and the piping of both the systems 11, 12, and a pressure gauge 19 is provided on the downstream side of the air filter 18 to measure pressure of the compressed air generated in the air supply source 10.

The pressure regulating valve 13 of the testing system 12 is provided on the downstream of the pressure gauge 19 to regulate the pressure of the compressed air supplied from the air supply source 10 to a predetermined pressure. In this embodiment, the pressure regulating valve 13 is composed of an internal pilot-type pressure reducing valve having relief function and decompresses the compressed air with high pressure (e.g., 0.4 MPa) generated in the air supply source 10 to a testing air pressure (e.g., 0.2 MPa).

The supply/discharge valve 14 is a directional control valve provided on the downstream side of the pressure regulating valve 13, and is switched between an air supply position (the lower position in FIG. 2) for permitting air supply from the air supply source 10 to the tire T, and an air discharge position (the upper position in FIG. 2) for permitting discharge of air from the tire T (release to the atmosphere). In this embodiment, the supply/discharge valve 14 is composed of a directional control valve, the pilot pressure of which is electromagnetically controlled. When the supply/discharge valve 14 receives input of the pilot pressure and operates (ON state), it is switched to the above-mentioned air supply position to form a flow path for supplying the compressed air, regulated to the testing air pressure by the pressure regulating valve 13, to the tire T. When the supply/discharge valve 14 does not receive the input of the pilot pressure and does not operate (OFF state), it is switched to the above-mentioned air discharge position to form a flow path for discharging the compressed air inside the tire T to the outside through a silencer 28.

A tank 23 (accumulator) capable of storing the compressed air inside the piping, which is pressure-regulated by the pressure regulating valve 13, is provided between the pressure regulating valve 13 and the supply/discharge valve 14.

The changeover valve 15 is provided on the downstream side of the supply/discharge valve 14 to switch, for the route from the supply/discharge valve 14 to the tire T, between the airflow path (piping) of the testing system 12 and the airflow path (piping) of the bead seat system 11, whereby the air pressure inside the tire T is switched between the testing air pressure and the bead pressure that is higher than it. In this embodiment, this changeover valve 15 is composed of a directional control valve, the pilot pressure of which is electromagnetically controlled. When the changeover valve 15 receives input of the pilot pressure and operates (ON state), it forms a flow path for supplying the compressed air, which is pressure-regulated to the bead pressure by the bead pressure regulating valve 22 of the bead seat system 11, to the inside of the tire T. When the changeover valve 15 does not receive the input of the pilot pressure and does not operate (OFF state), it forms a flow path for supplying the compressed air, which is pressure-regulated to the testing air pressure by the pressure regulating valve 13 of the testing system 12, to the inside of the tire T.

The shutoff valve 16 is a directional control valve provided on the downstream side of the changeover valve 15, and is switched between an opening position (the upper position in FIG. 2) for opening the flow path of compressed air and a shut-off position (the lower position in FIG. 2) for closing the flow path to seal compressed air within the airflow passage between the shutoff valve 16 and the tire T. In this embodiment, the shutoff valve 16 is composed of a directional control valve, the pilot pressure of which is electromagnetically controlled. When the shutoff valve 16 receives input of the pilot pressure and operates (ON state), it interrupts the circulation of compressed air between the upstream side and downstream side of the shutoff valve 16. When the shutoff valve 16 does not operate (OFF state), it permits free circulation of compressed air.

The pressure detection unit 17 includes an air pressure sensor provided on the downstream side of the shutoff valve 16, and detects an air pressure inside the tire T. In this embodiment, this air pressure sensor is connected to the air passage 8 formed inside the upper tire shaft 4 and provided in the vicinity of the tire T so that the air pressure inside the tire T fitted to the rims 6, 7 can be accurately detected. The pressure detection unit 17 outputs, as a control signal, an electric signal according to the air pressure to the volume adjustment mechanism 21. The volume adjustment mechanism 21 is configured, as described later, to increase/decrease, according to minor pressure variation of the compressed air to be exerted on the inside of the tire T, the volume of the compressed air to be exerted on the inside of the tire T, and performs fine control of the air pressure based on a detection signal input from the pressure detection unit 17.

In this embodiment, the bead pressure regulating valve 22, which is a pressure regulator having the same structure as the pressure regulating valve 13, regulates the pressure of the compressed air supplied from the air supply source 10 to a bead pressure higher than the testing air pressure, unlike the pressure regulating valve 13.

The reason for providing the volume adjustment mechanism 21 is as follows. Although the pressure regulating valve 13 regulates the air pressure to be exerted on the inside of the tire T to the testing air pressure, the air pressure inside the tire T can minutely change during tire testing in practice in spite of this pressure regulation. Such a minor change of air pressure is as small as 0.5 kPa to 1 kPa, and it is difficult to finely regulate the pressure with the pressure regulating valve 13 having pressure regulating accuracy of only ±0.1% (e.g., about 1 kPa in case of a pressure regulator with rating of 1.0 MPa). The above-mentioned volume adjustment mechanism 21 allows fine adjustment of the air pressure inside the tire T by increasing/decreasing the volume of the air inside the airflow path between the tire T and the pressure regulating valve 13 and inside the tire T.

The volume adjustment mechanism 21 according to the first embodiment is provided in the piping (airflow path) of the testing system 12 including the shutoff valve 16. The shutoff valve 16 is provided, as described above, between the pressure regulating valve 13 and the tire T fitted between the pair of rims 6, 7 of the tire testing device 2, and the volume adjustment mechanism 21 is provided in the piping (airflow path) further on the downstream side of the shutoff valve 16.

In this embodiment, the volume adjustment mechanism 12 includes, as a means for increasing/decreasing the volume of the compressed air inside the piping disposed on the downstream side of the shutoff valve 16 and inside the tire T, that is, the volume of the compressed air to be exerted on the inside of the tire T, an air cylinder, a servomotor 26 for driving the air cylinder, and a power conversion mechanism 27 for converting a power generated by the servomotor 26 to a drive force for driving the air cylinder.

The air cylinder includes a cylinder 24, a piston 25 moving within the cylinder 24, and a piston rod 25a connected to the piston 25. The cylinder 24 has a hollowed cylindrical shape, with one axial end thereof communicating with piping (airflow path) between the shutoff valve 16 and the pressure detection unit 17, and the other end being opened to the outside through a silencer 20. The piston 25 is inserted into the cylinder 24 to air-tightly partition the inside space of the cylinder 24 into two chambers, and is moved within the cylinder 24 to increase/decrease the capacity of the chamber communicating with the piping (airflow path) on the downstream side of the shutoff valve 16 (the head-side chamber in an example shown in FIG. 2), whereby the volume of compressed air in the piping can be adjusted. The piston rod 25a is extended from the piston 25 to the side opposite to the piping, and exposed out of the cylinder 24.

The power conversion mechanism 27 includes a rack and a pinion that are mutually meshed, the rack being fixed along the piston rod, and the pinion being fixed to an output shaft of the servomotor 26. Accordingly, the power conversion mechanism 27 moves the piston rod 25a and the piston 25 linearly in accordance with the rotation of the servomotor 26.

The servomotor 26 has a function as a drive unit for driving the piston 25 and a function as a control unit for controlling the moving direction and moving speed of the piston 25 (travel distance per predetermined control operation time) according to a change of air pressure inside the tire T detected by the pressure detection unit 17. The control operation time means a predetermined unit time for controlling the volume adjustment mechanism 21 according to the change of air pressure, which corresponds to the time required for one operation of the volume adjustment mechanism 21.

Concretely, this servomotor 26 determines a moving direction and moving speed of the piston 25 corresponding to the amount of the change of the air pressure or the increasing/decreasing direction thereof. The value obtained by converting a volume change of the air cylinder per control operation time into a pressure change of compressed gas acting on the inside of the tire T is set to a value smaller than the pressure regulating accuracy of the pressure regulating valve 13, whereby minor variation of air pressure that cannot be regulated by the pressure regulating valve 13 can be compensated. Such control that the moving direction and moving speed of the piston 25 are determined according to the change of air pressure enhances the accuracy of volume adjustment, compared with, for example, simple position control of the piston 25 or torque control of the servomotor 26, allowing further accurate regulation of the air pressure inside the tire T.

In the tire testing device 2 with such a pneumatic circuit 1, tire testing is performed according to the following procedure.

Firstly, the air pressure inside the tire T is regulated to the bead pressure by use of the piping of the bead seat system 1, whereby inflation of the tire T is performed in a short time. Concretely, the changeover valve 15 is put into ON state and the shutoff valve 16 into OFF state. The changeover valve 15 in the ON state disconnects the airflow path of the testing system 12 from the shutoff valve 16 and connects the airflow path of the bead seat system 11 to the shutoff valve 16. The shutoff valve 16 in the ON state permits the inflow circulation of compressed air from the bead seat system 11 to allow the compressed air to be supplied to the tire T through the route on the bead seat system 11 side.

More specifically, the pressure of the compressed air generated in the air supply source 10 is regulated to the bead pressure by the bead pressure regulating valve 22 provided at the middle of the route on the bead seat system 11 side. The compressed air thus regulated to the bead pressure is supplied to the tire T through the changeover valve 15 and the shutoff valve 16, whereby the tire T is inflated in a short time, and the bead portions not shown of the tire T are firmly fitted to the rims 6, 7.

After the installation of the tire T to the rims 6, 7 is thus completed, the air pressure inside the tire T is switched to the testing air pressure, which is lower than the bead pressure, for a preparation for tire testing. Concretely, the changeover valve 15 is switched from ON state to OFF state with the supply/discharge valve 14 being in ON state and the shutoff valve 16 being in OFF state to switch, for the flow path of compressed air, from the piping of the bead seat system 11 to the piping of the testing system 12. Concretely, the changeover valve 15 disconnects the piping of the bead seat system 11 from the tire T and connects the piping of the testing system 12 to the tire T to allow the supply of compressed air to the tire T through the piping of the testing system 12.

The pressure regulating valve 13 of the testing system 12 regulates the compressed air generated in the air supply source 10 to the testing air pressure, and decompresses the compressed air inside the tire T, which has been regulated to the bead pressure, to the testing air pressure by releasing it to the outside. A part of the compressed air regulated to the testing air pressure by the pressure regulating valve 13 is supplied to the tire T through the supply/discharge valve 14, the changeover valve 15 and the shutoff valve 16, and the remainder is stored in the tank 23. The air pressure inside the tire T is regulated to the testing air pressure by this compressed air.

When the air pressure inside the tire T detected by the pressure detection unit 17 reaches the testing air pressure, the shutoff valve 16 is operated into ON state to interrupt the airflow path between the changeover valve 15 and the tire T. Namely, the shutoff valve 16 disconnects the airflow path (the inside of the piping) on the downstream side of the shutoff valve 16 and the inside of the tire T from the circuit on the upstream side of the shutoff valve 16 to form a closed space, whereby the preparation for tire testing is completed.

During tire testing, the air pressure inside the tire T often finely varies. Such variation of the air pressure inside the tire T includes both decrease and increase of air pressure. The pressure detection unit 17 provided in the vicinity of the tire T detects both the decrease and increase and outputs a detection signal corresponding to the air pressure.

The volume adjustment mechanism 21 finely adjusts the air pressure to be exerted on the inside of the tire based on the detection signal outputted by the pressure detection unit 17. Concretely, the servomotor 26 of the volume adjustment mechanism 21 drives the piston 25 of the air cylinder, whereby the volume of the cylinder chamber on the side communicating with the airflow path of the above-mentioned closed space (the head-side chamber) is changed to increase/decrease the volume of the compressed air within the closed space (inside the piping and inside the tire T), whereby the air pressure to be exerted on the inside of the tire T is corrected to the testing air pressure. When the air pressure inside the tire T detected by the pressure detection unit 17 varies to be lower than the testing air pressure, for example, the piston 25 of the volume adjustment mechanism 21 is driven in a direction of reducing the volume of the cylinder chamber on the side communicating with the piping. Due to this, the volume of the compressed air inside the piping and inside the tire T is reduced, and the air pressure inside the tire T is increased as much, whereby the air pressure can be returned to the testing air pressure. On the other hand, when the air pressure inside the tire T varies to be higher than the testing pressure, the piston 25 is driven in the direction opposite to the above, that is, in a direction of increasing the volume of the cylinder chamber on the side communicating with the piping to increase the air pressure inside the tire T to the testing air pressure.

When the tire T is removed after such tire testing, the shutoff valve 16 is switched to OFF state with the changeover valve 15 being in OFF state (namely, with the piping of the testing system 12 being in use) to allow the circulation of compressed air between the inside of the tire T and the supply/discharge valve 14. In this state, the supply/discharge valve 14 is switched to OFF state to discharge the compressed air inside the tire T and the volume adjustment mechanism 21 out of the piping through the silencer 28. Namely, the compressed air is released to the atmosphere. Then, an installation preparation for the next tire T and the return of the piston 25 of the volume adjustment mechanism 21 to its original position are performed.

At that time, the supply/discharge valve 14 and the changeover valve 15 each of which is in OFF state can contribute to reduction in supply time of compressed air in the subsequent tire testing. Concretely, the changeover valve 15 disconnects the piping on the upstream side (the piping of the bead seat system 11) from the piping on the downstream side, whereby compressed air can be left within the piping on the upstream side in spite of the discharge of the compressed air inside the tire T. The supply/discharge valve 14 also disconnects the piping on the upstream side (the piping of the testing system 12) from the piping on the downstream side, whereby compressed air can be left within the piping on the upstream side in spite of the discharge of the compressed air inside the tire T. The compressed air is left within each piping, whereby the time required for supply of compressed air at the start of the subsequent tire testing can be significantly reduced.

As just described, the volume adjustment mechanism 21 can surely perform fine control in response to minor variation of air pressure, which is hardly regulated by the general pressure regulator as described above, by increasing/decreasing the volume of the compressed air inside the piping forming the airflow path between the tire T and the pressure regulating valve 13, as well as inside the tire T. Accordingly, the tire T can be maintained at the testing air pressure with high accuracy during tire testing to enable accurate measurement of uniformity.

When the volume adjustment mechanism 21 is provided with the air cylinder as described above as a concrete means for increasing/decreasing the volume of compressed air, the air pressure inside the tire T can be adjusted at low cost. Namely, the fine adjustment of the air pressure can be performed without a steep rise in price of the tire testing device 2.

Further, the shutoff valve 16 according to this embodiment contributes also to stabilization of a tire testing condition by disconnecting the flow path on the downstream side of the shutoff valve 16 from the pressure regulating valve 13. Even if the pressure regulating valve 13, which generally never operates by minor pressure variation that is caused during tire testing, operates unexpectedly by any factor, the shutoff valve 16 prevents the effect of the pressure regulating valve 13 from extending to the downstream side of the shutoff valve 16 by disconnecting the flow path on the downstream side thereof from the pressure regulating valve 13 to allow execution of tire testing in a further stabilized testing condition.

Figure 3:
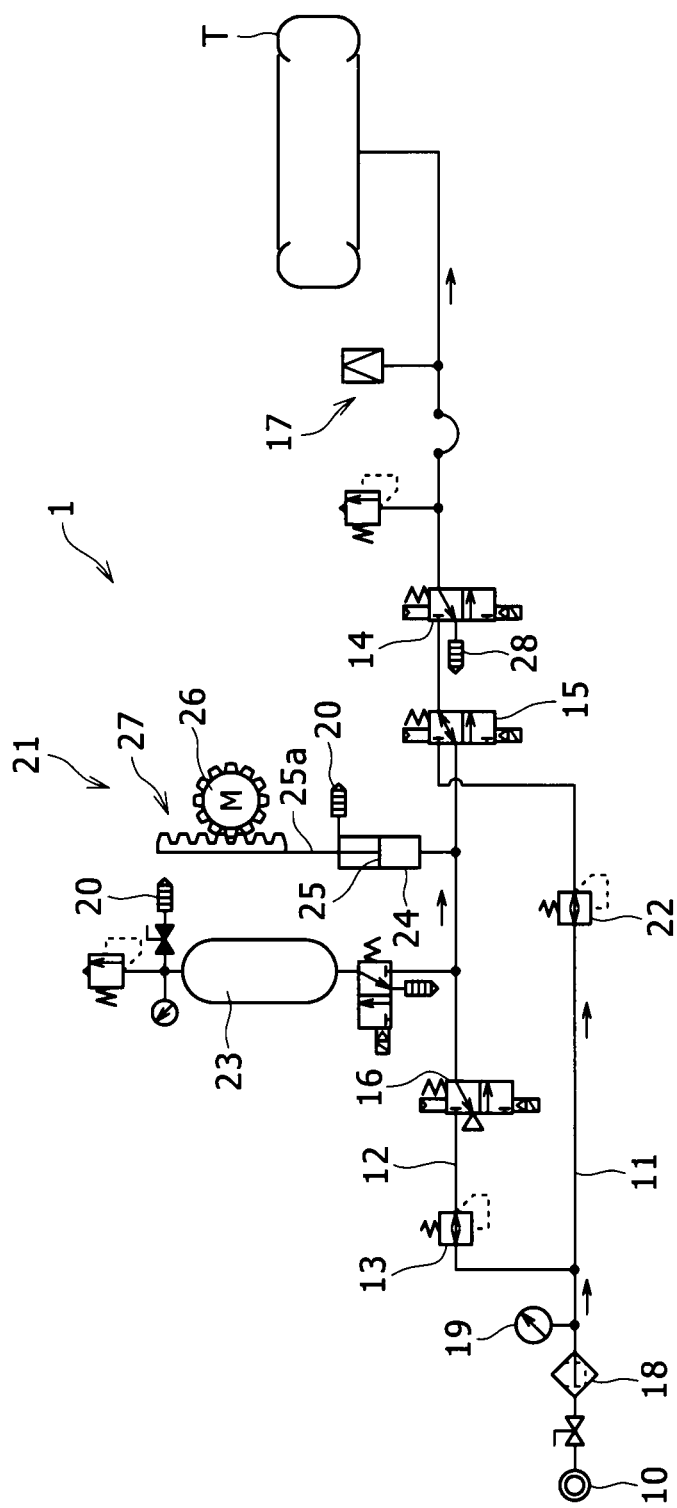
FIG. 3 A view showing a pneumatic circuit according to a second embodiment of the present invention.

Next, a pneumatic circuit 1 according to a second embodiment of the present invention and a tire testing device 2 provided with the same will be described with reference to FIG. 3.

The pneumatic circuit 1 according to the second embodiment is differed from that of the first embodiment in the following points.

1) The positions of the supply/discharge valve 14 and the shutoff valve 16 are mutually replaced. Concretely, the supply/discharge valve 14 according to the second embodiment is provided in the flow path on the downstream side of the changeover valve 15, that is, in the airflow path between the shutoff valve 15 and the tire T installed between the rims 6, 7. The shutoff valve 16 according to the second embodiment is provided in the flow path of the testing system 12 that is the flow path on the upstream side of the changeover valve 15, and interposed between the changeover valve 15 and the pressure regulating valve 13.

2) The tank 23 and volume adjustment mechanism 21 according to the second embodiment are connected to the flow path of the testing system 12. Concretely, the tank 23 is connected to the flow path of the testing system 12 at a position between the shutoff valve 16 and the changeover valve 15, and the volume adjustment mechanism 21 is connected to the flow path of the testing system 12 at a position on the downstream side of the tank 23, that is, a position between the tank 23 and the changeover valve 15. Therefore, this volume adjustment mechanism 21 increases/decreases the volume of compressed air in three parts that are the inside of the airflow path on the downstream side of the shutoff valve 16, the inside of the tire T and the inside of the tank 23, in other words, the compressed air that exerts pressure on the inside of the tire T.

Namely, in the pneumatic circuit 1 of the second embodiment, the shutoff valve 16 is provided between the pressure regulating valve 13 and the changeover valve 15 in the airflow path of the testing system 12, the tank 23 is provided between the shutoff valve 16 and the changeover valve 15, and the volume adjustment mechanism 21 is disposed adjacently to the downstream side of the tank 23. The shutoff valve 16 is operated to disconnect the airflow path on the downstream side thereof from the upstream side, whereby not only the airflow path (the inside of the piping) on the downstream side of the shutoff valve 16 and the inside of the tire T but also the inside of the tank 23 are disconnected from the flow path on the upstream side thereof (that is, are made into a closed space). The volume adjustment mechanism 21 adjusts the volume of the compressed air in three parts that are the inside of the piping, the inside of the tire T and the inside of the tank 2, that is, the compressed air within the closed space.

In tire testing by use of the tire testing device 2 according to the second embodiment, the shutoff valve 16 is driven after the air pressure inside the tire T detected by the pressure detection unit 17 reaches the testing air pressure, whereby the inside of the airflow path on the downstream side of the shutoff valve 16, the inside of the tank 23 and the inside of the tire T are disconnected from the flow path on the upstream side of the shutoff valve 16. If the air pressure inside the tire T varies during tire testing, the volume adjustment mechanism 21 adjusts the volume of not only the compressed air existing inside the airflow path on the downstream side of the shutoff valve 16 and inside the tire T but also the compressed air inside the tank 23.

Since the above-mentioned tank 23 stores the compressed air inside the airflow path, which is pressure-regulated by the pressure regulating valve 13, the volume of compressed air to be adjusted is increased as much as the capacity of the tank 23. Therefore, even if the air pressure inside the tire T varies, the variation is relatively small, compared with the total volume of the compressed air within the closed space, and thus hardly affects the measurement accuracy of uniformity. Since the volume adjustment mechanism 21 can dispense with accurate adjustment of volume adjustment amount, a general air cylinder or the like can be used as the volume adjustment mechanism 21, and the manufacturing cost of the tire testing device 2 can be reduced.

Since other configurations and function effects in the second embodiment are the same as in the first embodiment, the description thereof is omitted.

Figure 4:
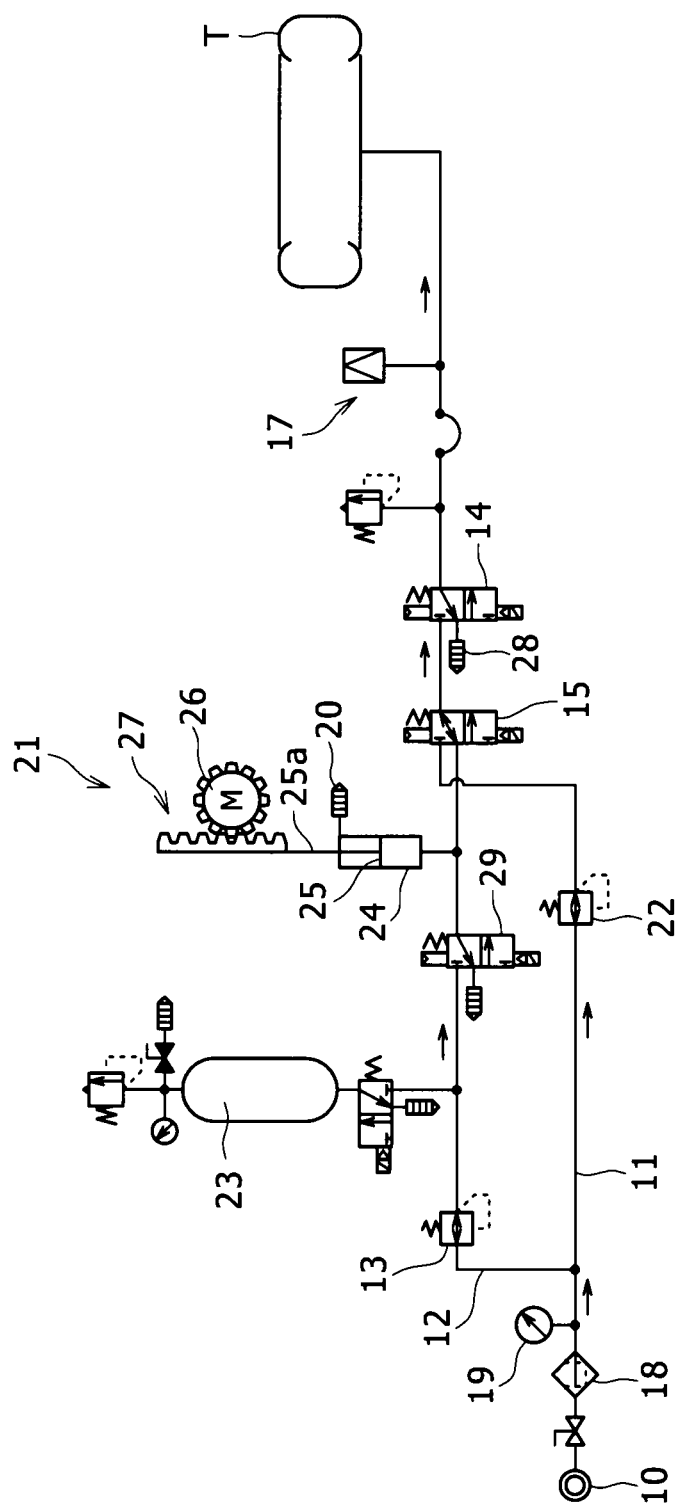
FIG. 4 A view showing a pneumatic circuit according to a third embodiment of the present invention.

A pneumatic circuit 1 according to a third embodiment of the present invention and a tire testing device 2 provided with the same will be then described with reference to FIG. 4.

The pneumatic circuit 1 according to the third embodiment is not provided with the shutoff valve 16, unlike the second embodiment, although the tank 23 and the volume adjustment mechanism 21 are provided between the pressure regulating valve 13 and the supply/discharge valve 14 similarly to the second embodiment. A supply/discharge valve 29 is provided between the tank 23 and the volume adjustment mechanism

21. This supply/discharge valve 29 plays a part of the function (discharge of air in decompression from the bead seat pressure to the testing air pressure and discharge of air in release of the tire internal pressure after testing) of the supply/discharge valve 14 provided in the test system 12 of FIG. 2, and is used for the discharge of air in the decompression from the bead seat pressure to the testing air pressure.

The present invention is established depending on the characteristics of the pressure regulating valve 13 unless the shutoff valve 16 for interrupting the circulation of compressed air to the tire T is provided as in this embodiment. Concretely, when a pressure regulator having only pressure regulating accuracy such that the pressure regulator is not operated by minor pressure variation caused during tire testing is used as the pressure regulating valve 13, this pressure regulating valve 13 can be allowed to function instead of the shutoff valve 16 to substantially seal the compressed air inside the airflow path (inside the piping) on the downstream of the pressure regulating valve 13, inside the tire T and inside the tank 23, in other words, the compressed air that exerts pressure on the inside of the tire T. Accordingly, in this case, the volume adjustment mechanism 21 can accurately adjust the volume of the compressed air substantially sealed on the downstream side of the pressure regulating valve 13 (the compressed air that exerts pressure on the inside of the tire T) without the shutoff valve 16 as shown in FIG. 4.

Since other configurations and function effects in the third embodiment are the same as in the second embodiment, the description thereof is omitted.

Next, a pneumatic circuit 1 according to a fourth embodiment of the present invention and a tire testing device 2 provided with the same will be described.

The pneumatic circuit 1 according to the fourth embodiment includes the volume adjustment mechanism 21 which controls only the moving direction of the piston 25, while the volume adjustment mechanisms of the first to third embodiments control the moving direction and moving speed of the piston 25 based on an air pressure detected by the pressure detection unit 17. Concretely, in the pneumatic circuit 1 of the fourth embodiment, a value obtained by converting the volume to be changed in the control operation time (the volume change per control operation time of the volume adjustment mechanism 21) to a variation value of the air pressure to be exerted on the inside of the tire T is set to be a fixed value smaller than the pressure regulating accuracy of the pressure regulating valve 13 which regulates the inside of the tire T to the testing air pressure. The volume adjustment mechanism 21 determines, based on the air pressure detected by the pressure detection unit 17, only the moving direction of the piston 25 according to the variation amount of the detected air pressure or the increasing/decreasing direction thereof.

For example, when the air pressure detected by the pressure detection unit 17 is lower than a predetermined air pressure, the thus-constituted volume adjustment mechanism 21 moves the piston 25 in a direction of increasing the air pressure to be exerted on the inside of the tire T, that is, in normal direction, to adjust the inside of the tire T to the testing air pressure. When the air pressure is higher than the predetermined air pressure, the mechanism moves the piston 25 oppositely to the normal direction. If the inside of the tire T does not reach the testing air pressure even by moving the piston 25, the piston 25 may be repetitively moved. Due to this, the air pressure inside the tire T can be adjusted with high accuracy which cannot be attained by the pressure regulating valve 13.

In the fourth embodiment, since calculation of the moving speed or torque of the piston rod by the air adjustment mechanism 21 is dispensed with, the time necessary for control is reduced. Therefore, this is effective for an extremely reduced control operation time of the volume adjustment mechanism 21.

The present invention is never limited by each of the above-mentioned embodiments, and the shape, structure, material, combination and the like of each member can be properly changed without departing from the gist of the invention.

The tire testing device according to the present invention is never limited to the uniformity machine as described above. The pneumatic circuit according to the present invention can be applied to tire testing machines for evaluations other than uniformity.

Although, in each of the above-mentioned embodiments, the air pressure of the tire T is switched by the changeover valve 15 that switches, for the compressed air supply route, between the route including the pressure regulating valve 13 and the route including the bead pressure regulating valve 22, the present invention is never limited thereto. For example, the air pressure of the tire T can be switched to two or more kinds of different pressures by only the operation of the pressure regulating valve 13 composed of a pilot changeover valve or electromagnetic changeover valve.

Although, in the above-mentioned embodiments, a pressure reducing valve is used as the pressure regulating valve 13 for regulating pressure on the secondary side to a predetermined value, a sequence valve, for example, or the like can be used for the pressure regulating valve 13.

Although, in the volume adjustment mechanism 21 according to each of the above-mentioned embodiments, the power conversion mechanism 27 for converting a rotational driving force of the servomotor 26 to a linear motion of the piston 25 is composed of a rack and a pinion, the power conversion mechanism 27 may be configured to use a feed screw. As the power source for driving the piston 25, a linear motor may be used.

Although the volume adjustment mechanisms 21 according to the first to third embodiments control the moving direction and moving speed of the piston 25 based on an air pressure detected by the pressure detection unit 17, the volume adjustment mechanism according to the present invention may control the torque of the servomotor 26 or the position of the piston 25 according to a change of air pressure detected by the pressure detection unit 17, for example.

As described so far, the present invention provides a pneumatic circuit for tire testing device, capable of surely adjusting minor variation of air pressure, which is caused during tire testing, in a short time. The present invention also provides a tire testing device and a tire testing method, capable of accurately inspecting a tire at low cost by using this pneumatic circuit.

The present invention provides a pneumatic circuit, provided in a tire testing device having a tire holding unit for holding a tire, which is configured by a pair of rims, for example, including: an air supply source for supplying compressed air to the tire held by the tire holding unit; a pressure regulating valve for regulating the pressure of the compressed air, which is supplied from the air supply source to the tire, to a testing air pressure; a pressure detection unit for detecting an air pressure to be exerted on the inside of the tire; and a volume adjustment mechanism connected to an airflow path between the inside of the tire and the pressure regulating valve. The volume adjustment mechanism increases/decreases, according to variation of the air pressure, the volume of the compressed air that exerts pressure on the inside of the tire, which is pressure-regulated by the pressure regulating valve.

For example, the present invention may further include: a supply/discharge valve provided on the downstream side of the pressure regulating valve to supply the compressed air to the tire and to discharge the compressed air from the tire, wherein the pressure detection unit may be provided on the downstream side of the supply/discharge valve, and the volume adjustment mechanism may increase/decrease the volume of the compressed air inside the airflow path between the tire and the pressure regulating valve and inside the tire.

The present invention is achieved by paying attention to a relationship between pressure and volume of compressed air. Concretely, assuming that compressed air of a fixed mass has a constant temperature, the product of pressure and volume of the compressed air is maintained constant by the Boyle's law. The above-mentioned pressure variation during tire testing is generally less than 0.5 kPa. Thus, if the pressure variation is replaced by volume variation, the adjustment amount of volume is not large. For example, if 50 liters of compressed air of 0.2 MPa is sealed within a tire and an airflow path, and a pressure variation of 0.5 kPa occurs, this pressure variation corresponds to about 0.125 liter (125 cm$^3$) in terms of volume variation. Namely, it is considered that it is extremely difficult to regulate the pressure of 0.5 kPa by use of a 1.0 MPa-rated pressure regulating valve, however, the volume of air of about 125 cm$^3$ can be sufficiently adjusted by use of an air cylinder or the like.

The present inventors conceived, from such a point of view, that minor variation of air pressure inside a tire can be surely adjusted in a short time by providing a volume adjustment mechanism for increasing/decreasing the volume of compressed air inside piping connecting the tire to a pressure regulating valve and inside the tire, and completed the present invention.

This volume adjustment mechanism can be concretely adopted in pneumatic circuits as described below.

1) For example, in a pneumatic circuit including a shutoff valve provided between the pressure regulating valve and the installed tire so as to be capable of interrupting the circulation of the compressed air from the pressure regulating valve to the tire, it is preferable that the volume adjustment mechanism is connected to the airflow path on the downstream side of the shutoff valve, and operated to increase/decrease the volume of the compressed air inside the airflow path installed on the downstream side of the shutoff valve and inside the tire. When the shutoff valve interrupts the circulation of compressed air from the pressure regulating valve to the tire to disconnect the airflow path on the downstream side of the shutoff valve from the flow path on the upstream side, the volume adjustment mechanism only has to adjust the volume of the compressed air inside the airflow path on the downstream side of the shutoff valve and inside the tire, in other words, the compressed air that exerts pressure on the inside of the tire. Namely, since the volume of the air to be adjusted by the volume adjustment mechanism is small, the air pressure inside the tire can be adjusted with further good responsiveness and accuracy.

The above-mentioned shutoff valve enables further stabilized measurement of tire. When a general pressure regulator is applied to the pressure regulating valve, the pressure regulating valve generally never operates by minor pressure variation that is caused during tire testing. However, if the pressure regulating valve is operated for any unexpected reason, the air pressure inside the tire may become unstable and vary for this time period. Even in such a case, the shutoff valve prevents a malfunction of the pressure regulating valve from affecting the air pressure on the downstream side of the shutoff valve by interrupting the circulation of compressed air from the pressure regulating valve to the tire, whereby the uniformity of the tire, for example, can be further stably measured.

2) In a pneumatic circuit including a shutoff valve provided between the pressure regulating valve and the installed tire so as to be capable of interrupting the circulation of the compressed air from the pressure regulating valve to the tire, and a tank provided on the downstream side of the shutoff valve so as to be capable of storing the compressed air inside the airflow path, which is pressure-regulated by the pressure regulating valve, it is preferable that the volume adjustment mechanism is connected to the airflow path on the downstream side of the shutoff valve similarly to the tank, and operated to increase/decrease the volume of the compressed air that exerts pressure on the inside of the airflow path, the tire and the tank. The tank capable of storing the compressed air inside the air flow path, which is pressure-regulated by the pressure regulating valve as described above, minimizes the range of the variation of air pressure inside the tire caused during tire testing by increasing the air volume in the pneumatic circuit and functioning as a buffer. As a result, the change of air pressure inside the tire is minimized so as to hardly affect the measurement accuracy of tire test such as uniformity. Even if variation of air pressure occurs in spite of such increase of air volume in the pneumatic circuit due to the tank, the volume adjustment mechanism suppresses the variation of air pressure to enable accurate measurement of, for example, the uniformity of the tire. In this case, the volume adjustment mechanism can be composed of a general air cylinder since accurate adjustment of the volume is not required. This enables a reduced manufacture cost of the tire testing device.

3) In a pneumatic circuit including the supply/discharge valve, and a tank provided between the supply/discharge valve and the pressure regulating valve so as to be capable of storing the compressed air pressure-regulated by the pressure regulating valve, it is preferable that the volume adjustment mechanism is operated to increase/decrease the volume of the compressed air that exerts pressure on the inside of the airflow path on the downstream side of the pressure regulating valve, the tire and the tank.

It is preferable that the volume adjustment mechanism according to the present invention includes an air cylinder including a cylinder communicating with the airflow path and a piston moving within the cylinder, and a drive unit for adjusting the volume of the compressed air inside the airflow path by moving the piston within the cylinder. The use of such a volume adjustment mechanism using the air cylinder enables accurate adjustment of the air pressure inside the tire at low cost.

It is preferable that the volume adjustment mechanism including the air cylinder and the drive unit further includes a control unit for controlling the drive of the piston performed by the drive unit. It is preferable that the control unit controls the driving direction and speed of the piston performed by the drive unit or the driving direction and torque thereof according to the change of the air pressure detected by the pressure detection unit. The drive unit and the control unit can be composed of, for example, a servomotor.

The present invention also provides a tire testing device including: a tire holding unit for holding a tire; and a pneumatic circuit for supplying air pressure to the tire held by the tire holding unit, the pneumatic circuit being composed of the any one of the above-mentioned pneumatic circuits. According to this tire testing device, uniformity of the tire, for example, can be accurately measured by adjusting minor variation of air pressure inside the tire, which is caused during tire testing, in a short time.

The present invention further provides a tire testing method for testing a tire held by a tire holding unit. The tire testing method provided by the present invention includes: regulating the pressure of compressed air by a pressure regulating valve to a predetermined testing air pressure and testing the tire while exerting the regulated pressure on the inside of the tire; and increasing/decreasing the volume of the compressed air that exerts pressure on the inside of the tire, which is pressure-regulated by the pressure regulating valve, according to minor variation of air pressure inside the tire, which is caused in spite of the regulation by the pressure regulating valve, so as to compensate the variation. According to this method, the tire testing is performed while the inside of the tire is maintained at the predetermined testing air pressure by supplying or discharging the compressed air, the pressure of which is regulated by the pressure regulating valve, to and from the tire. And when the air pressure inside the tire varies during the testing, the air pressure inside the tire may be adjusted to the testing air pressure by increasing/decreasing the volume of the compressed air inside an airflow path between the tire held by the tire holding unit and the pressure regulating valve and the compressed air inside the tire.

By increasing/decreasing the volume of the compressed air, the air pressure can be adjusted to the testing air pressure in a short time in response to minor variation of air pressure that cannot be regulated by the pressure regulating valve, and the uniformity of the tire, for example, can be accurately measured.

The invention claimed is:

1. A pneumatic circuit for tire testing device provided in a tire testing device having a tire holding unit for holding a tire, comprising:
    an air supply source for supplying compressed air to the tire held by the tire holding unit;
    a pressure regulating valve for regulating the pressure of the compressed air, which is supplied from said air supply source to the tire, to a testing air pressure;
    a pressure detection unit for detecting an air pressure to be exerted on the inside of the tire by the supply of the compressed air; and
    a volume adjustment mechanism connected to an airflow path between the inside of the tire and said pressure regulating valve, said volume adjustment mechanism increasing/decreasing, according to variation of the air pressure, the volume of the compressed air that exerts pressure on the inside of the tire, which is pressure-regulated by said pressure regulating valve.

2. The pneumatic circuit for tire testing device according to claim 1, further comprising:
    a supply/discharge valve provided on the downstream side of said pressure regulating valve to supply the compressed air to the tire and to discharge the compressed air from the tire, wherein
    said pressure detection unit is provided on the downstream side of said supply/discharge valve, and
    said volume adjustment mechanism increases/decreases the volume of the compressed air inside said airflow path between the tire and said pressure regulating valve and inside the tire.

3. The pneumatic circuit for tire testing device according to claim 1, further comprising:
    a shutoff valve provided between said pressure regulating valve and the tire so as to be capable of interrupting the circulation of the compressed air from said pressure regulating valve to the tire, wherein
    said volume adjustment mechanism is connected to said airflow path on the downstream side of said shutoff valve, and operated to increase/decrease the volume of the compressed air inside said airflow path installed on the downstream side of said shutoff valve and inside the tire.

4. The pneumatic circuit for tire testing device according to claim 1, further comprising:
    a shutoff valve provided between said pressure regulating valve and the installed tire so as to be capable of interrupting the circulation of the compressed air from said pressure regulating valve to the tire, and
    a tank provided on the downstream side of said shutoff valve so as to be capable of storing the compressed air inside said airflow path, which is pressure-regulated by said pressure regulating valve, wherein
    said volume adjustment mechanism is connected to said airflow path on the downstream side of said shutoff valve similarly to said tank, and operated to increase/decrease the volume of the compressed air that exerts pressure on the inside of said airflow path, the tire and said tank.

5. The pneumatic circuit for tire testing device according to claim 2, further comprising:
    a tank provided between said supply/discharge valve and said pressure regulating valve so as to be capable of storing the compressed air pressure-regulated by said pressure regulating valve, wherein
    said volume adjustment mechanism is operated to increase/decrease the volume of the compressed air that exerts pressure on the inside of said airflow path on the downstream side of said pressure regulating valve, the tire and said tank.

6. The pneumatic circuit for tire testing device according to claim 1, wherein
    said volume adjustment mechanism includes an air cylinder including a cylinder communicating with said airflow path and a piston moving within said cylinder, and a drive unit for adjusting the volume of the compressed air inside said airflow path by moving said piston within said cylinder.

7. The pneumatic circuit for tire testing device according to claim 6, wherein
    said volume adjustment mechanism further includes a control unit for controlling the drive of said piston performed by said drive unit according to the change of the air pressure detected by said pressure detection unit.

8. The pneumatic circuit for tire testing device according to claim 7, wherein
    said volume adjustment mechanism controls the driving direction and speed of said piston performed by said drive unit according to the change of the air pressure detected by said pressure detection unit.

9. The pneumatic circuit for tire testing device according to claim 7, wherein
    said volume adjustment mechanism controls the driving direction and torque of said piston performed by said drive unit according to the change of the air pressure detected by said pressure detection unit.

10. A tire testing device comprising:
    a tire holding unit for holding a tire; and
    a pneumatic circuit for supplying air pressure to the tire held by said tire holding unit, said pneumatic circuit being composed of the pneumatic circuit according to claim 1.

11. A tire testing method for testing a tire held by a tire holding unit, comprising:
    regulating the pressure of compressed air by a pressure regulating valve to a predetermined testing air pressure and testing the tire while exerting the regulated pressure on the inside of the tire; and increasing/decreasing the volume of the compressed air that exerts pressure on the inside of the tire, which is pressure-regulated by the pressure regulating valve, according to minor variation of air pressure inside the tire, which is caused in spite of the regulation by the pressure regulating valve, so as to compensate the variation.

12. The tire testing method according to claim 11, wherein the tire is tested while the inside of the tire is maintained at the predetermined testing air pressure by supplying or discharging the compressed air, the pressure of which is regulated by the pressure regulating valve, to and from the tire, and when the air pressure inside the tire varies during the testing, the air pressure inside the tire is adjusted to the testing air pressure by increasing/decreasing the volume of the compressed air inside an airflow path between the tire held by the tire holding unit and the pressure regulating valve and the compressed air inside the tire.

\* \* \* \* \*